United States Patent [19]
Saito

[11] Patent Number: 5,530,590
[45] Date of Patent: Jun. 25, 1996

[54] LIQUID-IMMERSION TYPE OBJECTIVE LENS SYSTEM FOR MICROSCOPES

[75] Inventor: Yoshiharu Saito, Hachioji, Japan

[73] Assignee: Olympus Optical Co., Ltd., Tokyo, Japan

[21] Appl. No.: 218,825

[22] Filed: Mar. 28, 1994

[30] Foreign Application Priority Data

Mar. 29, 1993 [JP] Japan ................... 5-091877

[51] Int. Cl.⁶ ........................... G02B 21/02
[52] U.S. Cl. ........................... 359/658; 359/657
[58] Field of Search .................. 359/656, 657, 359/658, 659, 791, 660, 661

[56]  References Cited

U.S. PATENT DOCUMENTS

| | | | |
|---|---|---|---|
| 2,644,943 | 7/1951 | Klein | 359/657 |
| 4,373,785 | 2/1983 | Shoemaker | 359/656 |
| 4,666,256 | 5/1987 | Shimizu | 359/658 |

FOREIGN PATENT DOCUMENTS

| | | | |
|---|---|---|---|
| 56-142508 | 11/1981 | Japan . | |
| 59-155822 | 9/1984 | Japan | 359/658 |
| 61-162015 | 7/1986 | Japan . | |
| 61-240218 | 10/1986 | Japan | 359/656 |
| 3-50517 | 3/1991 | Japan . | |
| 3-58492 | 9/1991 | Japan . | |
| 4-26445 | 5/1992 | Japan . | |
| 5-142477 | 6/1993 | Japan | 359/657 |
| 5-196875 | 8/1993 | Japan . | |

*Primary Examiner*—David C. Nelms
*Assistant Examiner*—Son Mai
*Attorney, Agent, or Firm*—Cushman, Darby & Cushman

[57] ABSTRACT

A liquid-immersion type objective lens system for microscopes comprising a first lens unit which comprises a plano-convex lens component or a plano-convex lens component having a cemented surface strongly convex on the image side and a positive lens component, a second lens unit which has a positive refractive power, and comprises a cemented surface having a strongly negative refractive power and allows a converging light bundle to emerge therefrom, and a third lens unit having a negative refractive power. The object system is configured so as to be capable of correcting variations of aberrations by moving the second lens unit relative to the first lens unit and the third lens unit in accordance with a thickness of a cover glass plate used in combination with the objective lens system.

13 Claims, 6 Drawing Sheets

SPHERICAL ABERRATION

ASTIGMATISM

COMA

SPHERICAL ABERRATION

ASTIGMATISM

COMA

SPHERICAL ABERRATION

ASTIGMATISM

COMA

SPHERICAL
ABERRATION

ASTIGMATISM

COMA

SPHERICAL
ABERRATION

ASTIGMATISM

COMA

SPHERICAL ABERRATION

ASTIGMATISM

COMA

SPHERICAL ABERRATION

ASTIGMATISM

COMA

SPHERICAL ABERRATION

ASTIGMATISM

COMA

SPHERICAL ABERRATION

ASTIGMATISM

COMA 5,530,590

LIQUID-IMMERSION TYPE OBJECTIVE LENS SYSTEM FOR MICROSCOPES

BACKGROUND OF THE INVENTION a) Field of the Invention

The present invention relates to a liquid-immersion type apochromatic objective lens system for microscopes which has a large numerical aperture (NA) and is capable of favorably correcting aberrations irrespective of variations in thickness of transparent cover plane parallel plates (cover glass plates) to be disposed selectively on the object side of the objective lens system.

b) Description of the Prior Art

In the field of the recent microscopy, the confocal laser scanning microscopy (CLSM), the digital deconvolution technique, etc. have made it possible to perform three-dimensional observations of biological cells. Since culture liquids used for enclosing the biological cells have refractive indices which are close to that of water ($n_d = 1.33$) and far from that of the ordinary immersion oil for objective lens systems for microscopes ($n_d = 1.515$), the microscopes can form images with high qualities of objects disposed at design focusing locations of the microscopes {normally lower surfaces of the cover glass plates (in case of microscopes which are configured for use with objective lens systems positioned underside)}, but imaging performance of the microscopes is abruptly degraded as object points are deviated from the focusing locations in a direction along optical axes.

Two methods have hitherto been contrived to correct this defect: one is to adopt a water-immersion type objective lens system which is designed to use water in place of the immersion oil such as an objective lens system for microscopes disclosed by Japanese Patent Kokai Publication No. Hei 5-196,875; and the other is to adopt an objective lens system which is equipped with a lens moving mechanism functioning to correct aberrations produced due to changes in refractive index of media used for enclosing cells such as an objective lens system for microscopes disclosed by Japanese Patent Kokai Publication No. Sho 61-162,015.

The objective lens system for microscopes disclosed by the abovementioned Japanese Patent Kokai Publication No. Hei 5-196,875 is suited for three-dimensional observations of biological cells, but this objective lens system is incapable of correcting variations of aberrations which are caused by changes in thickness of cover glass plates. Generally speaking, objective lens systems for microscopes which are designed for use with immersion oils exhibit optical performance scarecely degraded by the variations in thickness of the cover glass plates (within a range from 0.15 mm to 0.2 mm) owing to a fact that the immersion oils have refractive indices close to those of the cover glass plates. In case of the water-immersion type objective lens systems for microscopes which use water having a refractive index largely different from those of the cover glass plates, however, a slight change of 0.005 mm in thickness of the cover glass plates produces an influence on the optical performance of the objective lens systems or remarkably degrades optical performance, in particular, of objective lens systems which have large numerical apertures. Further, when biological cells have refractive indices which are different from that of water, the variations in thickness of the cover glass plates cause remarkable variations of aberrations, thereby making it hard to correct aberrations.

Furthermore, there are known, in the field of dry type objective lens systems for microscopes, a large number of objective lens systems which are equipped with means for correcting aberrations aggravated by changes in thickness of the cover glass plates.

An objective lens system for microscopes disclosed by Japanese Patent Kokai Publication No. Sho 56-142,508, for example, is a lens system which consists of three lens units, i.e., a first lens component configured as a cemented meniscus lens component having a positive refractive power, a second lens component having a positive refractive power and a third lens component having a positive refractive power; and is configured so as to correct variations of aberrations caused due to changes in thickness of cover glass plates by moving a small number of lens components or the second lens unit in a direction along an optical axis.

Moreover, an objective lens system for microscopes disclosed by Japanese Patent Kokai Publication No. Hei 3-50,517 is a lens system which consists of three lens components, i.e., a first lens component which comprises a positive meniscus lens element and has a positive refractive power, a second lens component having a positive refractive power, and a third lens component having a negative refractive power; and is designed so as to correct variations of aberrations caused due to changes in thickness of cover glass plates by moving the second lens component in a direction along an optical axis though the lens system has a relatively large numerical aperture of 0.8. Similarly, each of the objective lens systems for microscopes disclosed by Japanese Patents Kokoku Publication No. Hei 3-58,492, Kokoku Publication No. Hei 4-26,445, etc. is a lens system which is equipped with a means for correcting aberrations produced due to changes in thickness of cover glass plates by moving a specific lens component out of lens components used for composing the objective lens system in a direction along an optical axis.

However, these objective lens systems for microscopes are dry type lens systems having numerical apertures which are not so large as those of the liquid-immersion type objective lens systems for microscopes and cannot correct aberrations sufficiently favorably.

In addition, a liquid-immersion type objective lens system for microscopes which is compatible with various type of immersion liquids is disclosed by the above-mentioned Japanese Patent Kokai Publication No. Sho 61-162,015. This objective lens system consists of a front lens unit and a rear lens unit, and is configured so as to correct aberrations produced due to variations in refractive index of the immersion liquids by moving the rear lens unit and perform focusing by moving the objective lens system as a whole. However, this conventional example is incapable of correcting aberrations when it has a large numerical aperture exceeding 1.

SUMMARY OF THE INVENTION

A primary object of the present invention is to provide a liquid-immersion type apochromatic objective lens system for microscopes which has a large numerical aperture and allows small variations of aberrations including chromatic aberration to be caused due to changes in thickness of cover glass plates or in refractive index of objects such as biological cells to be observed through the objective lens system.

The liquid-immersion type objective lens system for microscopes according to the present invention comprises, in order from the object side, a first lens unit $G_1$ which has a positive refractive power, and comprises a plano-convex lens element, or, a plano-convex lens component having a cemented surface strongly convex on the image side and a positive lens component, a second lens unit $G_2$ which has a positive refractive power, and comprises a cemented surface having a negative refractive power and allows a converging light bundle to emerge therefrom, and a third lens unit $G_3$ having a negative refractive power; and is characterized in that the second lens unit $G_2$ is movable along an optical axis relatively to the first lens unit $G_1$ and the third lens unit $G_3$ in accordance with thickness of a transparent plane parallel plate disposed between the first lens unit $G_1$ and an object to be observed through the objective lens system.

In the liquid-immersion type objective lens system for microscopes according to the present invention, the first lens unit $G_1$ is composed of a plano-convex lens element or a plano-convex lens component having cemented surface strongly convex on the image side and a positive lens component, and the convex surface of the plano-convex lens component satisfies the aplanatic condition for preventing spherical aberration from being produced. The first lens unit $G_1$ has the positive refractive power so that this lens unit will lead rays to the second lens unit $G_2$ while suppressing divergence of these rays.

Further, the second lens unit $G_2$ comprises the cemented surface having the negative refractive power and has the negative refractive power as a whole so that this lens unit functions to correct chromatic aberration and leads a converging light bundle to the third lens unit $G_3$. This second lens unit $G_2$ is movable for correcting spherical aberration which is produced due to variations in thickness of transparent plane parallel plates to be disposed selectively between the first lens unit $G_1$ and objects to be observed through the objective lens system.

Now, description will be made of a method for correcting spherical aberration which is produced due to a change in thickness of plane parallel plates in the liquid-immersion type objective lens system for microscopes having a large numerical aperture. In the liquid-immersion type objective lens system having the large numerical aperture, spherical aberration is largely varied when a plane parallel plate is exchanged with another having different thickness. In an attempt to correct this variation of spherical aberration by moving a lens unit, the movement of the lens unit will produce remarkable spherical aberration, thereby resulting in unbalance between spherical aberration and chromatic aberration. In this case, the moving lens unit has a role to change heights of rays incident on a fixed lens unit which is disposed at the next stage without allowing spherical aberration and chromatic aberration to be varied by the movement of the movable lens unit itself. When the heights of rays incident on the fixed lens unit are changed, spherical aberration to be produced by the fixed lens unit is varied, thereby making it possible to correct the spherical aberration which is varied due to the change in thickness of the plane parallel plate. Considering a fact that the spherical aberration which is varied due to the change in thickness of the plane parallel plate is positive and is to be corrected together with chromatic aberration, it is desirable that the fixed lens unit has a negative refractive power and produces positive spherical aberration.

In the liquid-immersion type objective lens system for microscopes according to the present invention, the spherical aberration which is varied due to the change in thickness of the plane parallel plate is cancelled not with the spherical aberration produced by the movable lens unit but with the spherical aberration which is produced by the third lens unit and varied dependently on the heights of rays on the fixed lens unit disposed on the image side of the movable lens unit.

When the second lens unit $G_2$, which comprises the cemented surface having the negative refractive power and has the positive refractive power as a whole, is disposed in the vicinity of a pupil of the objective lens system, spherical aberration and chromatic aberration are varied little by moving the second lens unit $G_2$. For this reason, the second lens unit $G_2$ of the objective lens system for microscopes according to the present invention has the role of the movable lens unit of the above-mentioned objective lens system for microscopes which has the large numerical aperture.

Furthermore, the third lens unit $G_3$ of the objective lens system for microscopes according to the present invention is adopted as the fixed lens unit described above and therefore has the negative refractive power. If the second lens unit $G_2$ has a negative refractive power, a total refractive power of the second lens unit $G_2$ and the third lens unit $G_3$ will be strongly negative whereby the first lens unit $G_1$ will have a strongly positive refractive power. If the first lens unit $G_1$ has too strong a positive refractive power in the objective lens system for microscopes which has a large numerical aperture, it will be impossible to correct spherical aberration in the objective lens system as a whole. It is therefore necessary that the second lens unit $G_2$ has the positive refractive power as described above.

In addition, it is necessary that the third lens unit $G_3$ of the objective lens system for microscopes according to the present invention has the role of the above-mentioned fixed lens unit and the negative refractive power for correcting curvature of field. Since a converging light bundle is incident on the third lens unit $G_3$, heights of rays incident on the third lens unit are lowered and the spherical aberration produced by the third lens unit $G_3$ is reduced when the second lens unit $G_2$ is moved along the optical axis in a direction to be farther from the third lens unit $G_3$. Since the negative spherical aberration produced by the first lens unit $G_1$ and the second lens unit $G_2$ is varied little, positive spherical aberration is produced in a small amount in the objective lens system for microscopes according to the present invention as a whole. When the second lens unit $G_2$ is moved in a direction to be closer to the third lens unit $G_3$, in contrast, the heights of the rays incident on the third lens unit $G_3$ are enhanced, whereby the third lens unit $G_3$ produces the positive spherical aberration in a larger amount. As a result, the positive spherical aberration is produced in a larger amount in the objective lens system for microscopes as a whole. On the other hand, the positive spherical aberration to be produced due to the change in thickness of the plane parallel plate disposed between the object to be observed and the objective lens system is decreased in an amount thereof when the plane parallel plate becomes thinner or increased in an amount thereof when the plane parallel plate becomes thicker. Accordingly, aberrations can be corrected favorably by moving the second lens unit $G_2$ so as to be closer to the third lens unit $G_3$ when the plane parallel plate becomes thinner or by moving the second lens unit $G_2$ so as to be farther from the third lens unit $G_3$ when the plane parallel plate becomes thicker.

For correcting aberrations more favorably, it is desirable to select the composition which is described below for the third lens unit $G_3$. Speaking concretely, the third lens unit $G_3$ should desirably have such a composition as to comprise a cemented meniscus lens component which consists of a positive lens element and a negative lens element, and another cemented meniscus lens component which consists of a negative lens element and a positive lens element, and has a concave surface disposed in opposition to a concave surface of the former cemented miscus lens component.

In order that the object side surface of the liquid-immersion type objective lens system (the surface which may be brought in contact with an immersion liquid) may not be covered with an immersion liquid which can hardly be wiped off or air which degrades optical performance of the objective lens system, the lens system has a planar surface on the most object side, thereby making it hard to correct curvature of field. In the objective lens system for microscopes according to the present invention, curvature of field is corrected toward the positive direction by disposing, in the third lens unit $G_3$, two lens components which have concave surfaces having high curvature and are disposed in opposition to each other. Further, longitudinal chromatic aberration and lateral chromatic aberration are corrected by configuring each of these lens components as a cemented lens components.

Now, description will be made of conditions which are required for correcting aberrations favorably. It is desirable that each of the lens units to be used for composing the objective lens system for microscopes according to the present invention satisfies the following conditions (1), (2) and (3):

(1) $1 < |f_1/f| < 2.5$ (2) $3 < |f_2/f| < 15$ (3) $7 < |f_3/f| < 75$ wherein the reference symbol f represents a focal length of the objective lens system as a whole, and the reference symbols $f_1$, $f_2$ and $f_3$ designate focal lengths of the first lens unit $G_1$, the second lens unit $G_2$ and the third lens unit $G_3$ respectively.

If the lower limit of 1 of the condition (1) is exceeded, the first lens unit $G_1$ will have a strong refractive power and produce negative spherical aberration in a large amount, thereby making it difficult to correct aberrations in the objective lens system as a whole. If the upper limit of 2.5 of the condition (1) is exceeded, the first lens unit $G_1$ will have a weak refractive power, and the second lens unit $G_2$ will have a strongly positive refractive power accordingly and produce spherical aberration and chromatic aberration in large amounts, whereby aberrations will be varied remarkably by moving the second lens unit $G_2$ and it will be difficult to correct aberrations in the objective lens system as a whole.

If the lower limit of 3 of the condition (2) is exceeded, the second lens unit $G_2$ will have too strong a refractive power, whereby chromatic aberration and spherical aberration will be varied remarkably by moving the second lens unit $G_2$ and it will be difficult to correct aberrations in the objective lens system as a whole. If the upper limit of 15 of the condition (2) is exceeded, the second lens unit $G_2$ will have a weak refractive power and the third lens unit $G_3$ will also have a weak refractive power accordingly, whereby it will be not easy to correct the variations of aberrations caused due to the change in thickness of the plane parallel plate disposed on the object side of the objective lens system.

If the lower limit of 7 of the condition (3) is exceeded, the third lens unit $G_3$ will produce positive spherical aberration and coma in large amounts, thereby making it difficult to correct aberrations in the objective lens system as a whole. Further, the movement of the second lens unit $G_2$ will cause remarkable variations of aberrations produced by the third lens unit $G_3$ and result in overcorrection of aberrations which are produced by the variations in thickness of the plane parallel plate. If the upper limit of 75 of the condition (3) is exceeded, it will be impossible to correct curvature of field and, at the same time, the third lens unit $G_3$ will produce aberrations in smaller amounts, thereby making it difficult to correct the aberrations produced due to the change in thickness of the plane parallel plate.

In addition, for correcting chromatic aberration produced due to the change in thickness of the plane parallel plate disposed on the object side of the objective lens system for microscopes according to the present invention, it is effective for the second movable lens unit $G_2$ to select the composition which is described below. Speaking concretely, it is desirable for correcting the chromatic aberration to compose the second movable lens unit $G_2$ so as to comprise a cemented lens component which consists of a positive lens element, a negative lens element and a positive lens element or a negative lens element, a positive lens element and a negative lens element.

In case of an apochromatic objective lens system which has a large numerical aperture, it is hard to correct the chromatic aberration when the objective lens system does not comprise a cemented lens component which consists of three such lens elements as those described above. In a case where a lens unit is to be moved in the objective lens system, in particular, it is desirable to compose the movable lens unit so as to comprise a cemented lens component consisting of such three lens elements, thereby reducing variations of spherical aberration and chromatic aberration. For correcting chromatic aberration more favorably in the objective lens system for microscopes according to the present invention, it is desirable to configure the second movable lens unit $G_2$ so as to comprise at least two lens components each of which has a positive refractive power and satisfies the following condition (4):

(4) $v_{2p} > 70$ wherein the reference symbol $v_{2p}$ represents an Abbe's number of the positive lens component which is comprised in the second movable lens unit $G_2$.

It will be difficult to correct chromatic aberration sufficiently favorably if the second movable lens unit $G_2$ does not comprise at least two positive lens components each of which satisfies the condition (4), or has an Abbe's number exceeding 70.

DETAILED DESCRIPTION OF THE PREFERRED EMBODIMENTS

Figure 1:
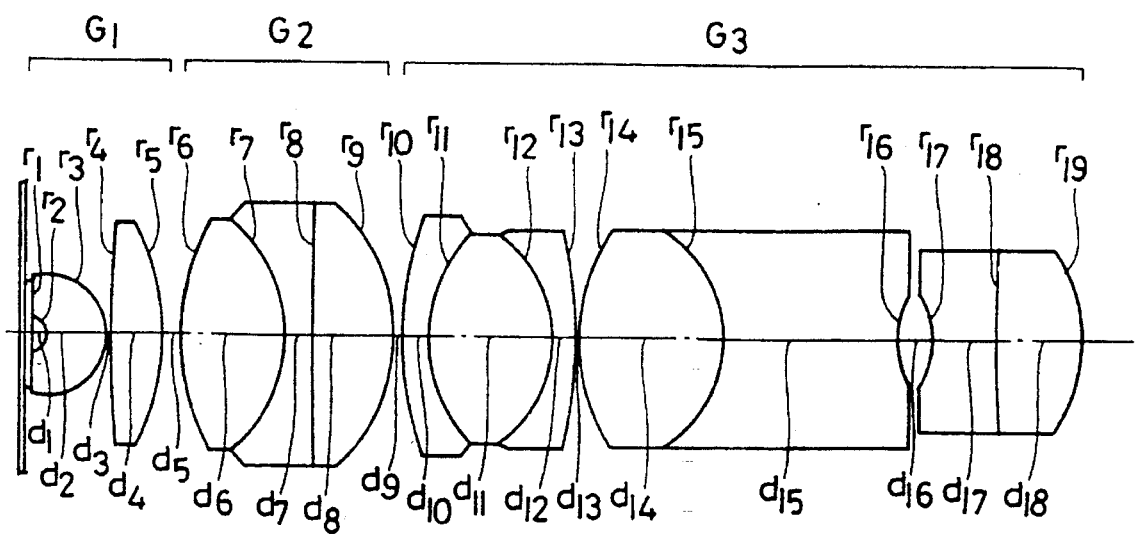
FIG. 1 shows a sectional view illustrating a composition of a first embodiment of the liquid-immersion type objective lens system for microscopes according to the present invention.

Now, the liquid-immersion type objective lens system for microscopes according to the present invention will be described mode detailedly below with reference to the preferred embodiments illustrated in the accompanying drawings and given in the form of the following numerical data:

Embodiment 1

$f = 2.892$, $NA = 1.15$, image height = 10.5, object distance = $-0.1750$ $r_1 = \infty$
$\quad d_1 = 0.6900 \quad n_1 = 1.50378 \quad \nu_1 = 66.81$
$r_2 = -0.8003$
$\quad d_2 = 2.7155 \quad n_2 = 1.78650 \quad \nu_2 = 50.00$
$r_3 = -2.6600$
$\quad d_3 = 0.2000$
$r_4 = 54.9121$
$\quad d_4 = 2.4000 \quad n_3 = 1.78650 \quad \nu_3 = 50.00$
$r_5 = -9.5242$
$\quad d_5 = D_1$ (variable)
$r_6 = 10.1548$
$\quad d_6 = 4.8000 \quad n_4 = 1.43875 \quad \nu_4 = 94.97$
$r_7 = -6.3000$
$\quad d_7 = 1.1500 \quad n_5 = 1.78650 \quad \nu_5 = 50.00$
$r_8 = 202.1692$
$\quad d_8 = 3.7000 \quad n_6 = 1.43875 \quad \nu_6 = 94.97$
$r_9 = -7.8211$
$\quad d_9 = D_2$ (variable)
$r_{10} = 15.4103$
$\quad d_{10} = 1.1000 \quad n_7 = 1.78650 \quad \nu_7 = 50.00$ -continued $r_{11} = 6.4029$
$\quad d_{11} = 5.8000 \quad n_8 = 1.43875 \quad \nu_8 = 94.97$
$r_{12} = -5.4177$
$\quad d_{12} = 1.0012 \quad n_9 = 1.61340 \quad \nu_9 = 43.84$
$r_{13} = -19.6199$
$\quad d_{13} = 0.1200$
$r_{14} = 8.7057$
$\quad d_{14} = 6.7000 \quad n_{10} = 1.49700 \quad \nu_{10} = 81.61$
$r_{15} = -5.3902$
$\quad d_{15} = 7.7834 \quad n_{11} = 1.52944 \quad \nu_{11} = 51.72$
$r_{16} = 4.1061$
$\quad d_{16} = 1.5801$
$r_{17} = -3.6364$
$\quad d_{17} = 2.8593 \quad n_{12} = 1.49831 \quad \nu_{12} = 65.03$
$r_{18} = 76.2530$
$\quad d_{18} = 3.9133 \quad n_{13} = 1.59551 \quad \nu_{13} = 39.21$
$r_{19} = -6.9216$

| thickness of plane parallel plate | 0.15 | 0.175 | 0.2 |
|---|---|---|---|
| WD | 0.291 | 0.27 | 0.25 |
| $D_1$ | 0.85 | 0.802 | 0.752 |
| $D_2$ | 0.352 | 0.4 | 0.45 |

$f_1 = 4.264$, $f_1/f = 1.47$
$f_2 = 23.02$, $f_2/f = 7.96$
$f_3 = -137.137$, $f_3/f = -47.42$

Embodiment 2

$f = 2.824$, $NA = 1.15$, image height = 10.5, object distance = $-0.1750$ $r_1 = \infty$
$\quad d_1 = 0.3550 \quad n_1 = 1.51633 \quad \nu_1 = 64.15$
$r_2 = -1.2997$
$\quad d_2 = 3.8518 \quad n_2 = 1.75500 \quad \nu_2 = 52.33$
$r_3 = -3.3272$
$\quad d_3 = 0.2000$
$r_4 = -17.8722$
$\quad d_4 = 2.5400 \quad n_3 = 1.56907 \quad \nu_3 = 71.30$
$r_5 = -6.5066$
$\quad d_5 = D_1$ (variable)
$r_6 = 18.7160$
$\quad d_6 = 4.2800 \quad n_4 = 1.43875 \quad \nu_4 = 94.97$
$r_7 = -7.0800$
$\quad d_7 = 1.3000 \quad n_5 = 1.69680 \quad \nu_5 = 56.49$
$r_8 = 16.5142$
$\quad d_8 = 5.3900 \quad n_6 = 1.49700 \quad \nu_6 = 81.61$
$r_9 = -9.8803$
$\quad d_9 = 0.3000$
$r_{10} = 9.5172$
$\quad d_{10} = 3.8600 \quad n_7 = 1.49700 \quad \nu_7 = 81.61$
$r_{11} = -2102.5954$
$\quad d_{11} = 0.3000$
$r_{12} = 17.1556$
$\quad d_{12} = 1.3000 \quad n_8 = 1.75500 \quad \nu_8 = 52.33$
$r_{13} = 5.3285$
$\quad d_{13} = 5.7000 \quad n_9 = 1.43875 \quad \nu_9 = 94.97$
$r_{14} = -7.5754$
$\quad d_{14} = 1.1000 \quad n_{10} = 1.61340 \quad \nu_{10} = 43.84$
$r_{15} = 62.6424$
$\quad d_{15} = D_2$ (variable)
$r_{16} = 5.8711$
$\quad d_{16} = 4.5000 \quad n_{11} = 1.45600 \quad \nu_{11} = 90.31$
$r_{17} = -5.5518$
$\quad d_{17} = 2.7028 \quad n_{12} = 1.53375 \quad \nu_{12} = 55.52$
$r_{18} = 3.3067$
$\quad d_{18} = 1.6302$
$r_{19} = -3.0618$
$\quad d_{19} = 2.6818 \quad n_{13} = 1.52944 \quad \nu_{13} = 51.72$
$r_{20} = 61.3605$
$\quad d_{20} = 3.9834 \quad n_{14} = 1.61293 \quad \nu_{14} = 37.00$
$r_{21} = -6.7268$

| thickness of plane parallel plate | 0.15 | 0.175 | 0.2 |
|---|---|---|---|
| WD | 0.288 | 0.27 | 0.252 |
| $D_1$ | 0.65 | 0.53 | 0.406 |
| $D_2$ | 0.41 | 0.53 | 0.654 |

$f_1 = 5.04$, $f_1/f = 1.78$
$f_2 = 15.835$, $f_2/f = 5.61$
$f_3 = -31.078$, $f_3/f = -11.00$

Embodiment 3

-continued f = 2.817, NA = 1.15, image height = 10.5,
object distance = −0.1750

| | | | |
|---|---|---|---|
| $r_1 = \infty$ | | | |
| | $d_1 = 3.2389$ | $n_1 = 1.50378$ | $v_1 = 66.81$ |
| $r_2 = -2.6216$ | | | |
| | $d_2 = 0.2000$ | | |
| $r_3 = -7.0408$ | | | |
| | $d_3 = 2.5400$ | $n_2 = 1.78650$ | $v_2 = 50.00$ |
| $r_4 = -4.9689$ | | | |
| | $d_4 = D_1$ (variable) | | |
| $r_5 = 13.6513$ | | | |
| | $d_5 = 4.2800$ | $n_3 = 1.43875$ | $v_3 = 94.97$ |
| $r_6 = -7.1000$ | | | |
| | $d_6 = 1.3000$ | $n_4 = 1.69680$ | $v_4 = 56.49$ |
| $r_7 = 16.5980$ | | | |
| | $d_7 = 5.3900$ | $n_5 = 1.43875$ | $v_5 = 94.97$ |
| $r_8 = -9.5631$ | | | |
| | $d_8 = 0.3000$ | | |
| $r_9 = 10.4605$ | | | |
| | $d_9 = 3.8600$ | $n_6 = 1.56907$ | $v_6 = 71.30$ |
| $r_{10} = -437.2302$ | | | |
| | $d_{10} = 0.3000$ | | |
| $r_{11} = 16.2237$ | | | |
| | $d_{11} = 1.5923$ | $n_7 = 1.78650$ | $v_7 = 50.00$ |
| $r_{12} = 5.4928$ | | | |
| | $d_{12} = 5.9452$ | $n_8 = 1.43875$ | $v_8 = 94.97$ |
| $r_{13} = -7.2104$ | | | |
| | $d_{13} = 1.1000$ | $n_9 = 1.61340$ | $v_9 = 43.84$ |
| $r_{14} = 77.6162$ | | | |
| | $d_{14} = D_2$ (variable) | | |
| $r_{15} = 6.8265$ | | | |
| | $d_{15} = 4.5000$ | $n_{10} = 1.49700$ | $v_{10} = 81.61$ |
| $r_{16} = -5.4459$ | | | |
| | $d_{16} = 4.4442$ | $n_{11} = 1.53375$ | $v_{11} = 55.52$ |
| $r_{17} = 3.6882$ | | | |
| | $d_{17} = 1.6302$ | | |
| $r_{18} = -3.0767$ | | | |
| | $d_{18} = 2.6069$ | $n_{12} = 1.52944$ | $v_{12} = 51.72$ |
| $r_{19} = 47.6226$ | | | |
| | $d_{19} = 3.9039$ | $n_{13} = 1.61293$ | $v_{13} = 37.00$ |
| $r_{20} = -6.8356$ | | | |
| thickness of plane parallel plate | 0.15 | 0.175 | 0.2 |
| WD | 0.208 | 0.193 | 0.179 |
| $D_1$ | 0.631 | 0.53 | 0.423 |
| $D_2$ | 0.429 | 0.53 | 0.637 |

$f_1 = 4.59$, $f_1/f = 1.63$
$f_2 = 14.592$, $f_2/f = 5.18$
$f_3 = -47.128$, $f_3/f = -16.73$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements for the d-line, the reference symbols $v_1, v_2, \ldots$ represent Abbe's numbers of the respective lens elements and the reference symbol WD designates a working distance of the lens system.

Figure 2:
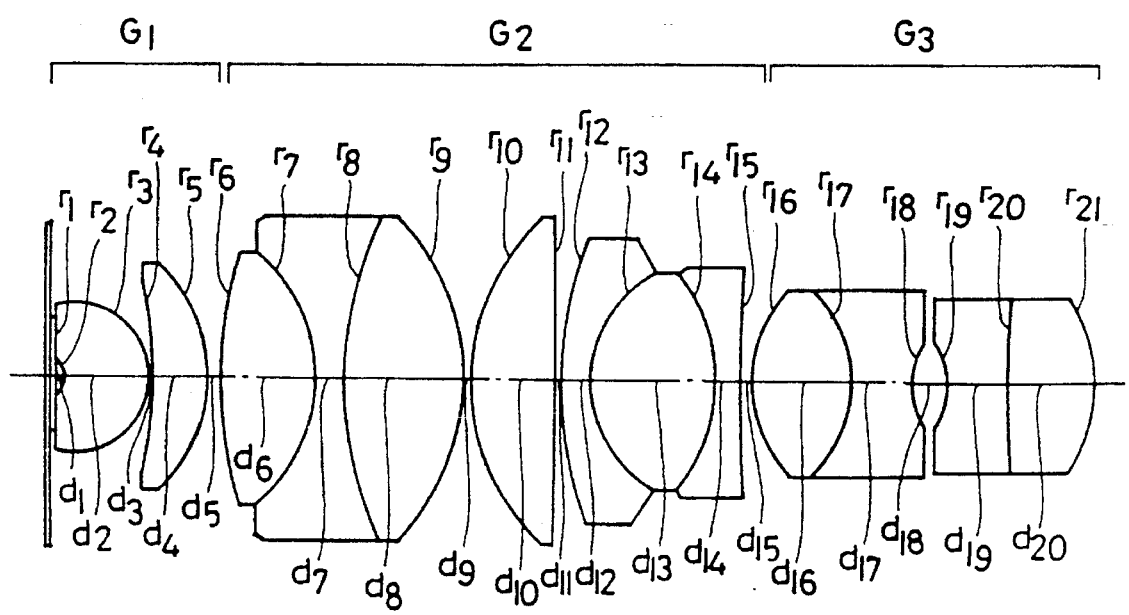
FIG. 2 shows a sectional view illustrating a composition of a second embodiment of the objective lens system for microscopes according to the present invention.
Figure 3:
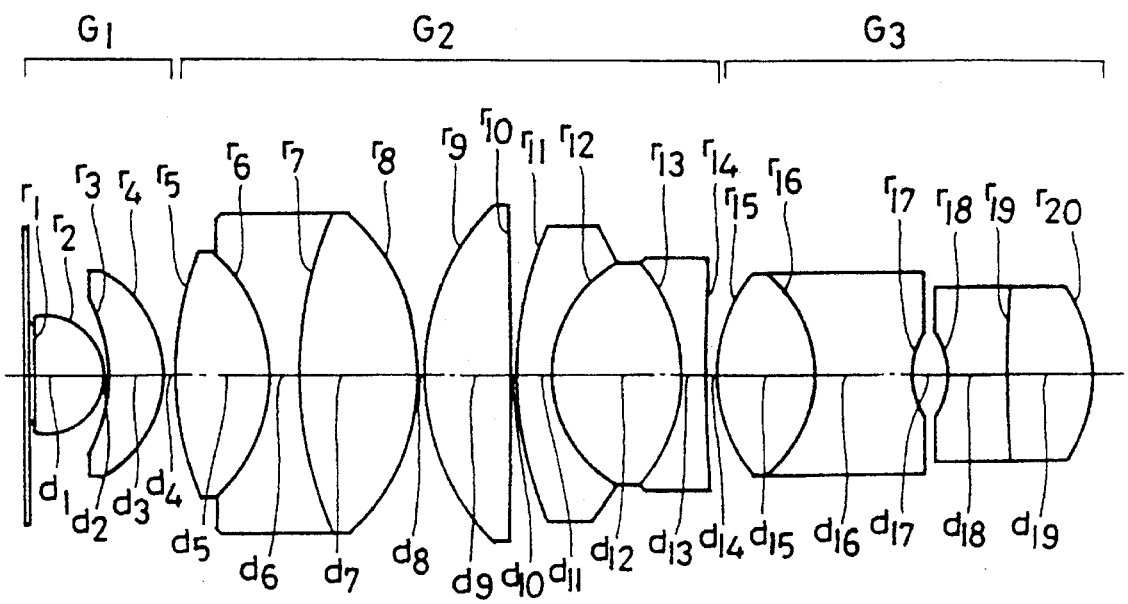
FIG. 3 shows a sectional view illustrating a composition of a third embodiment of the objective lens system for microscopes according to the present invention.
Figure 4A:
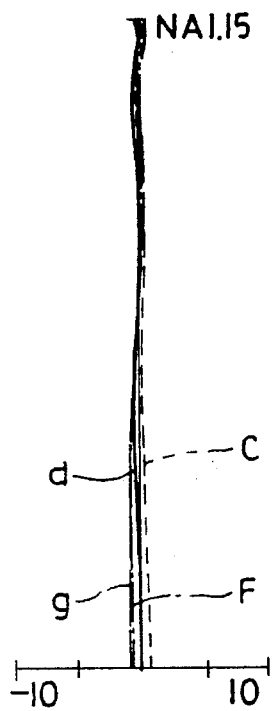
FIG. 4A, FIG. 4B and FIG. 4C show graphs illustrating aberration characteristics of the first embodiment of the present invention when it is used in combination with a plane parallel plate 0.15 mm thick.
Figure 4B:
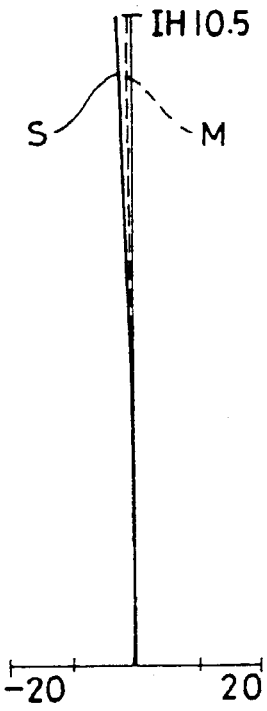
Figure 4C:
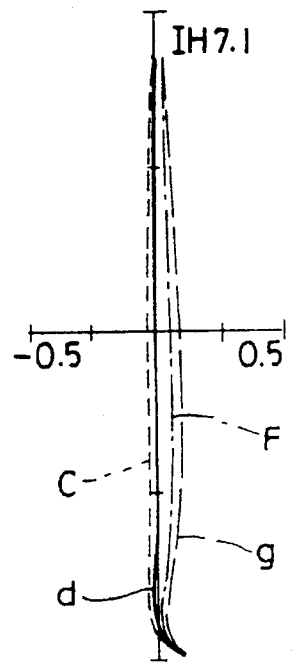
Figure 5A:
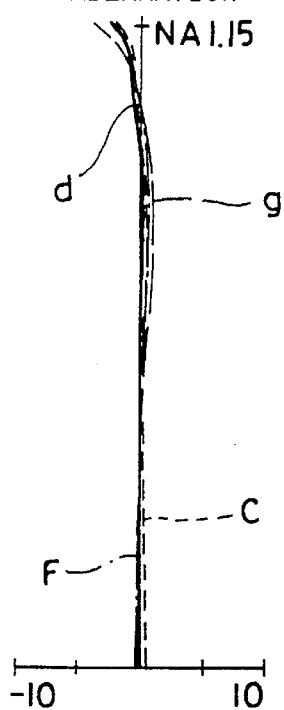
FIG. 5A, FIG. 5B and FIG. 5C show graphs visualizing aberration characteristics of the first embodiment of the present invention when it is used in combination with a plane parallel plate 0.175 mm thick.
Figure 5B:
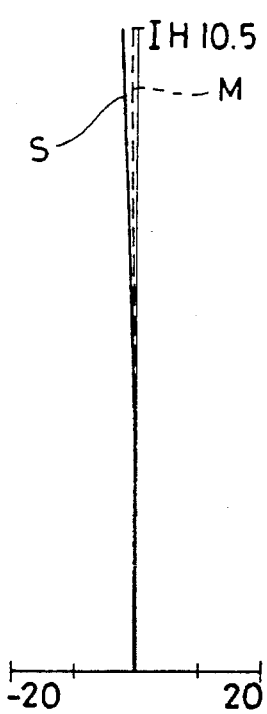
Figure 5C:
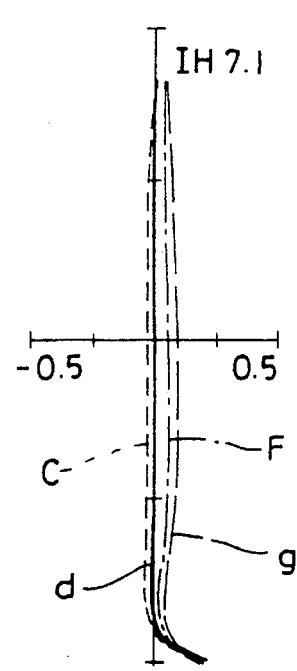
Figure 6A:
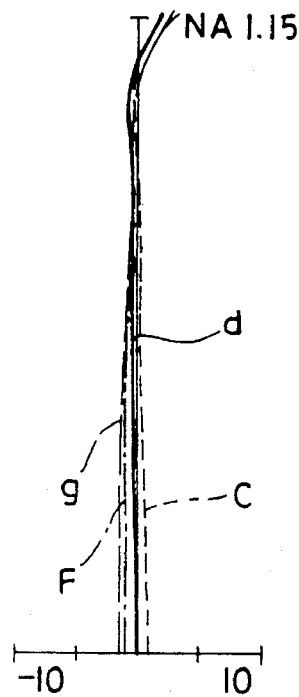
FIG. 6A, FIG. 6B and FIG. 6C show curves visualizing aberration characteristics of the first embodiment of the present invention when it is used in combination with a plane parallel plate 0.2 mm thick.
Figure 6B:
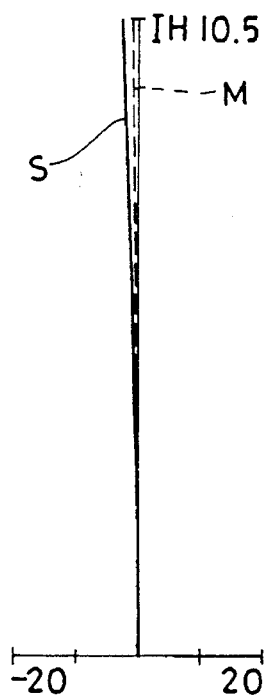
Figure 6C:
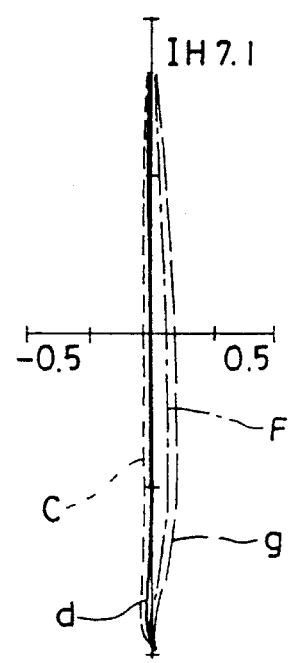
Figure 7A:
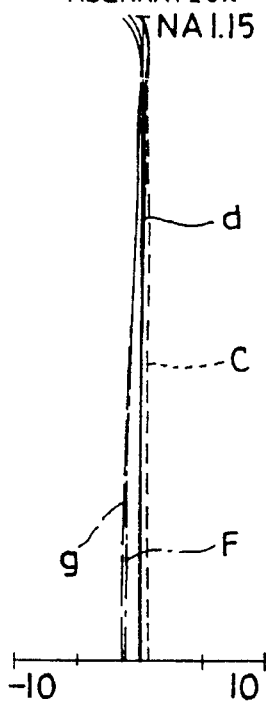
FIG. 7A, FIG. 7B and FIG. 7C show curves visualizing aberration characteristics of the second embodiment of the present invention when it is used in combination with the plane parallel plate 0.15 mm thick.
Figure 7B:
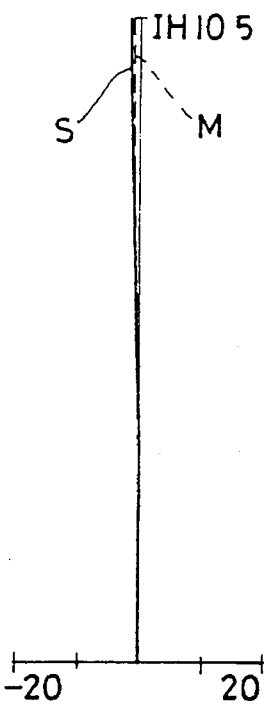
Figure 7C:
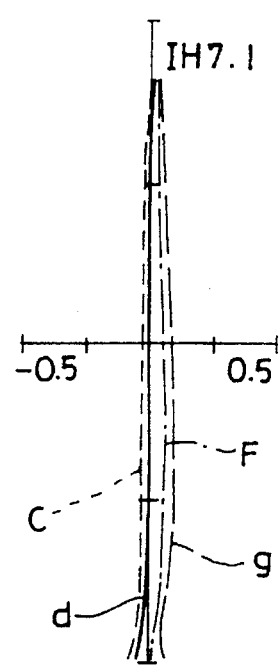
Figure 8A:
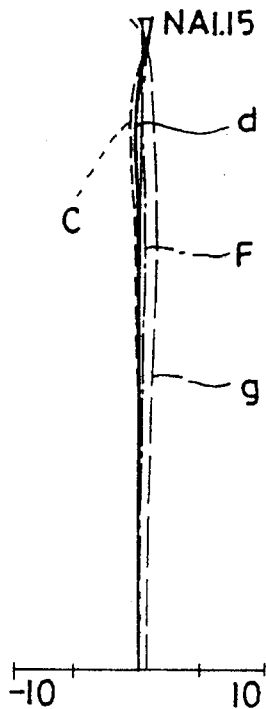
FIG. 8A, FIG. 8B and FIG. 8C show graphs illustrating aberration characteristics of the second embodiment of the present invention when it is used in combination with the plane parallel plate 0.175 mm thick.
Figure 8B:
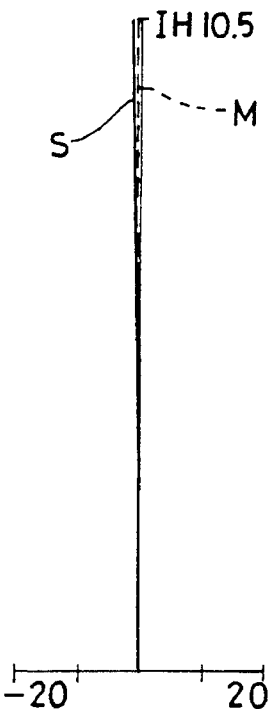
Figure 8C:
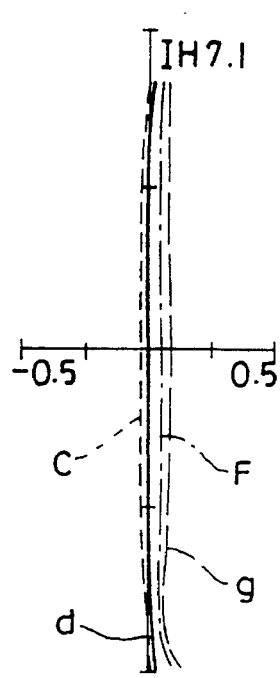
Figure 9A:
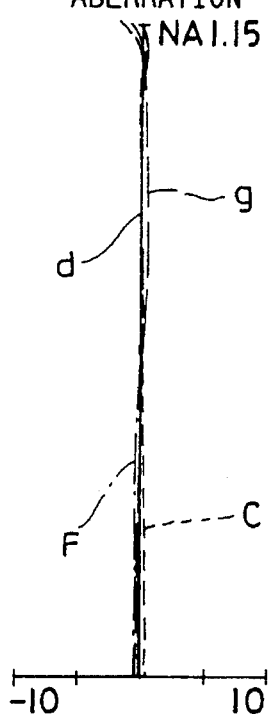
FIG. 9A, FIG. 9B and FIG. 9C show graphs illustrating aberration characteristics of the second embodiment of the present invention when it is used in combination with the plane parallel plate 0.2 mm thick.
Figure 9B:
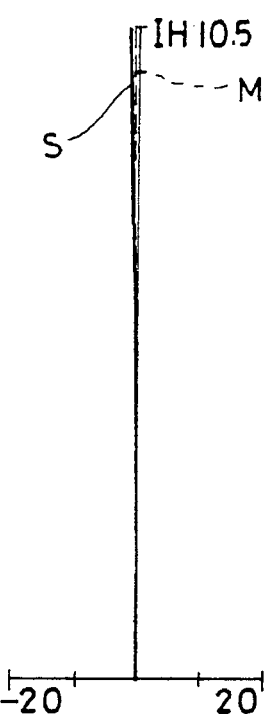
Figure 9C:
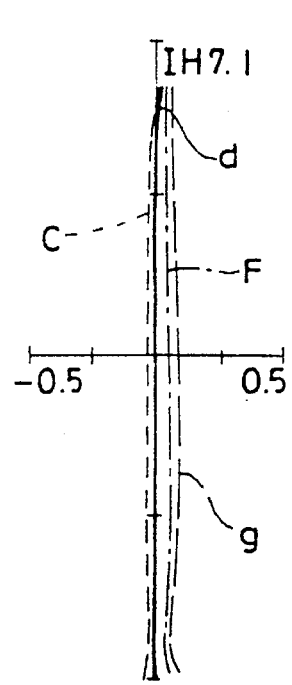
Figure 10A:
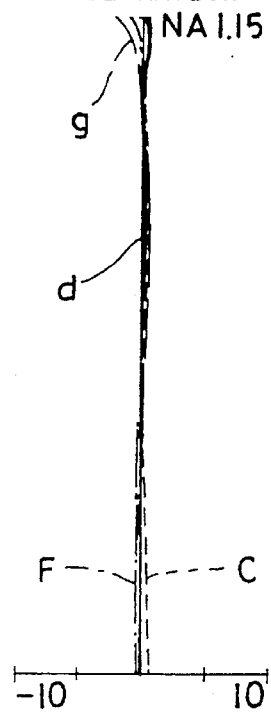
FIG. 10A, FIG. 10B and FIG. 10C show curves visualizing aberration characteristics of the third embodiment of the present invention when it is used in combination with the plane parallel plate 0.15 mm thick.
Figure 10B:
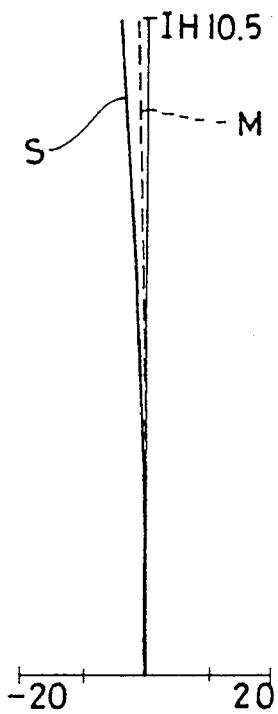
Figure 10C:
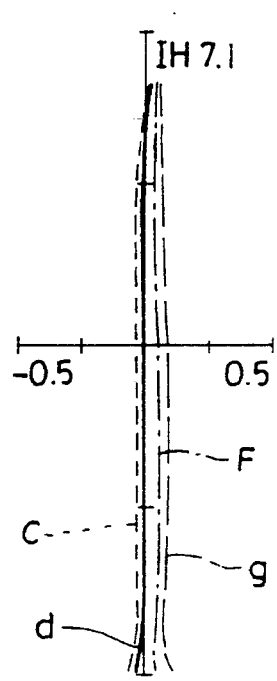
Figure 11A:
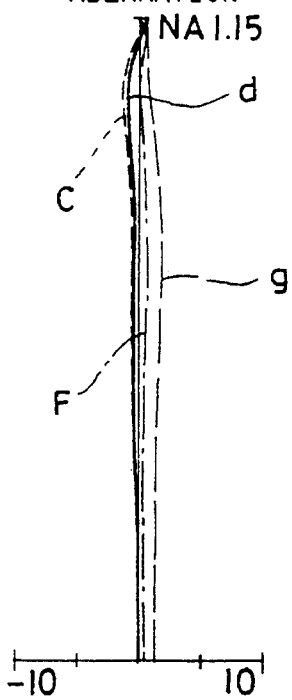
FIG. 11A, FIG. 11B and FIG. 11C show curves illustrating aberration characteristics of the third embodiment of the present invention when it is used in combination with the plane parallel plate 0.175 mm thick.
Figure 11B:
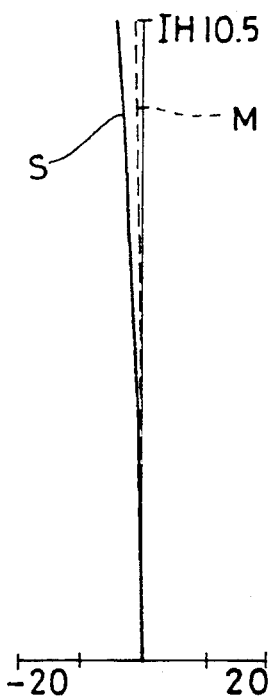
Figure 11C:
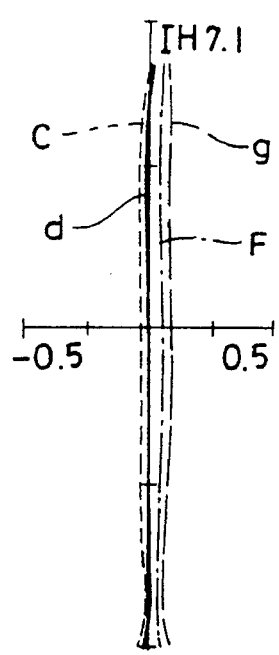
Figure 12A:
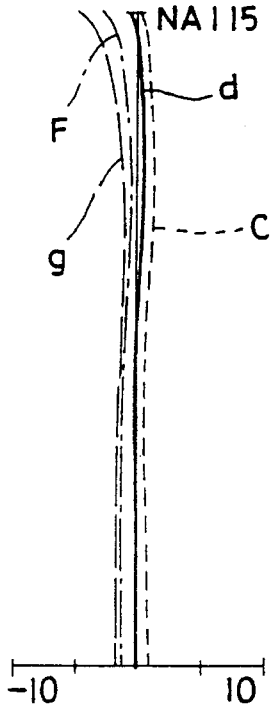
FIG. 12A, FIG. 12B and FIG. 12C show graphs illustrating aberration characteristics of the third embodiment of the present invention when it is used in combination with the plane parallel plate 0.2 mm thick.
Figure 12B:
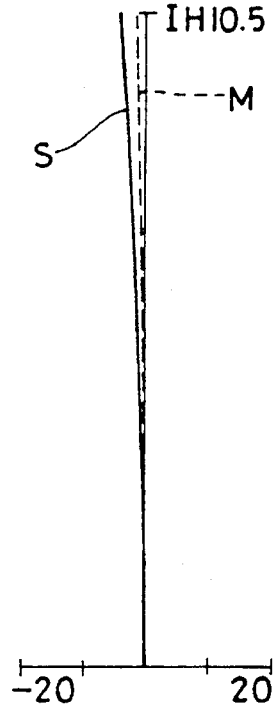
Figure 12C:
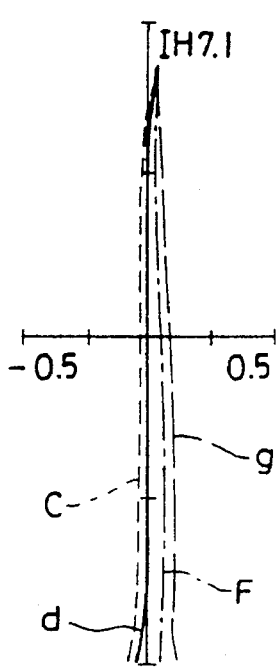

The first embodiment through the third embodiment of the present invention have the compositions illustrated in FIG. 1 through FIG. 3 respectively, a magnification of 60x and a numerical aperture of 1.15. Further, each of the plane parallel plates used in combination with these embodiments of the present invention has a refractive index of 1.521 and an Abbe's number of 56.02 in contrast to the refractive index of 1.33304 and the Abbe's number of 55.79 of water.

Listed in the numerical data shown above are locations and working distances of the second lens units (movable lens units) in conditions where the objective lens system for microscopes according to the present invention is used in combination with the plane parallel plates 0.15 mm, 0.175 mm and 0.2 mm thick respectively. Further, the aberration characteristics of the embodiments of the present invention are illustrated also in the conditions where the objective lens system is used in combination with the plane parallel plates which are described above.

The present invention has made it possible to obtain an apochromatic liquid-immersion type objective lens system for microscopes which has a large numerical aperture and is capable of favorably correcting aberrations irrespective of variations in thickness of transparent plane parallel plates disposed on the object side of the objective lens system.

I claim:

1. A liquid-immersion type objective lens system for microscopes comprising, in order from an object side:

a first lens unit which has a positive refractive power, said first lens unit comprising one of a plano-convex lens element and a plano-convex lens component having a cemented surface convex on an image side and a convex lens component;

a second lens unit which has a positive refractive power and a cemented surface having a negative refractive power, and allows a converging light bundle to emerge therefrom; and a third lens unit having a negative refractive power;

wherein said second lens unit is movable along an optical axis relatively to said first lens unit and said third lens unit in accordance with a thickness of a transparent plane parallel plate disposed between said first lens unit and an object to be observed through said objective lens system.

2. A liquid-immersion type objective lens system for microscopes according to claim 1, wherein:

said third lens unit comprises a first cemented meniscus lens component which consists of a positive lens element and a negative lens element, and a second cemented meniscus lens component which consists of a negative lens element and a positive lens element, and has a concave surface disposed to a concave surface of said first meniscus lens component.

3. A liquid-immersion type objective lens system for microscopes according to claim 1 or 2 satisfying the following conditions (1), (2) and (3):

(1) $1 < |f_1/f| < 2.5$ (2) $3 < |f_2/f| < 15$ (3) $7 < |f_3/f| < 75$ wherein said reference symbols $f_1$, $f_2$ and $f_3$ represent focal lengths of said first lens unit, said second lens unit, and said third lens unit, respectively, and reference symbol f designates a focal length of said objective lens system as a whole.

4. A liquid-immersion type objective lens system for microscopes according to claim 3, wherein:

said second lens unit comprises a cemented lens component which is composed by consecutively cementing three lens elements having refractive powers having different signs.

5. A liquid-immersion type objective lens system for microscopes according to claim 4, wherein:

said second lens unit comprises at least two positive lens components each of which is made of a glass material having an Abbe's number $v_{2p}$ satisfying the following condition (4):

(4) $v_{2p} > 70$.

6. A liquid-immersion type objective lens system for microscopes according to claim 1, wherein:

said first lens unit comprises a plano-convex lens component having a cemented surface convex on said image side and a biconvex lens component;

said second lens unit comprises a cemented lens component which consists of a positive lens element, a negative lens element and a positive lens element; and said third lens unit comprises a cemented lens component which consists of a negative lens element, a positive lens element and a negative lens element, and two cemented doublets which have concave surfaces opposed to each other.

7. A liquid-immersion type objective lens system for microscopes according to claim 1, wherein:

said first lens unit comprises a plano-convex cemented lens component having a cemented surface convex on said image side and a positive meniscus lens component having a concave surface on an object side;

said second lens unit comprises a cemented lens component which consists of a positive lens element, a negative lens element and a positive lens element, a positive lens, and a cemented lens which consists of a negative lens, a positive lens and a negative lens; and said third lens unit comprises two cemented doublets which have concave surfaces opposed to each other.

8. A liquid-immersion type objective lens system for microscopes according to claim 1, wherein:

said first lens unit comprises a plano-convex lens having a planar surface on said object side and a positive meniscus lens component having a concave surface on an object side;

said second lens unit comprises a cemented lens component which consists of a positive lens element, a negative lens element and a positive lens element, a positive lens component, and a cemented lens component which consists of a negative lens element, a positive lens element and a negative lens element; and said third lens unit comprises two cemented doublets which have concave surfaces opposed to each other.

9. A liquid-immersion type objective lens system for microscopes comprising:

a first lens unit having a positive refractive power;

a second lens unit which has a cemented surface having a negative refractive power and a positive refractive power as a whole; and a third lens unit having a negative refractive power;

wherein said second lens unit is disposed in a vicinity of a pupil of said objective lens system, and is moved along an optical axis relatively to said first lens unit and said third lens unit in accordance with a thickness of a transparent plane parallel plate disposed between said first lens unit and an object to be observed through said objective lens system;

wherein said third lens unit produces positive spherical aberration; and wherein said second lens unit is moved so as to vary an amount of spherical aberration to be produced by said third lens unit.

10. A liquid-immersion type objective lens system for microscopes according to claim 9, wherein;

said second lens unit is moved so as to be farther from said third lens unit when said transparent plane parallel plate is thick and so as to be closer to said third lens unit when said transparent plane parallel plate is thin.

11. A liquid-immersion type objective lens system for microscopes according to claim 1 or 2 satisfying the following condition (1):

(1) $1 < |f_1/f| < 2.5$ wherein said reference symbol $f_1$ represents a focal length of said first lens unit, and said reference symbol f designates a focal length of said objective lens system as a whole.

12. A liquid-immersion type objective lens system for microscopes according to claim 1 or 2 satisfying the following condition (2):

(2) $3 < |f_2/f| < 15$ wherein said reference symbols $f_2$ represents a focal length of said second lens unit, and said reference symbol f designates a focal length of said objective lens system as a whole.

13. A liquid-immersion type objective lens system for microscopes according to claim 1 or 2 satisfying the following condition (3):

(3) $7 < |f_3/f| < 75$ wherein said reference symbols $f_3$ represents a focal length of said third lens unit, and said reference symbol f designates a focal length of said objective lens system as a whole.

* * * * *